No. 790,305. PATENTED MAY 23, 1905.
H. R. MASON.
FLUID PRESSURE BRAKE.
APPLICATION FILED AUG. 19, 1903.
2 SHEETS—SHEET 1.
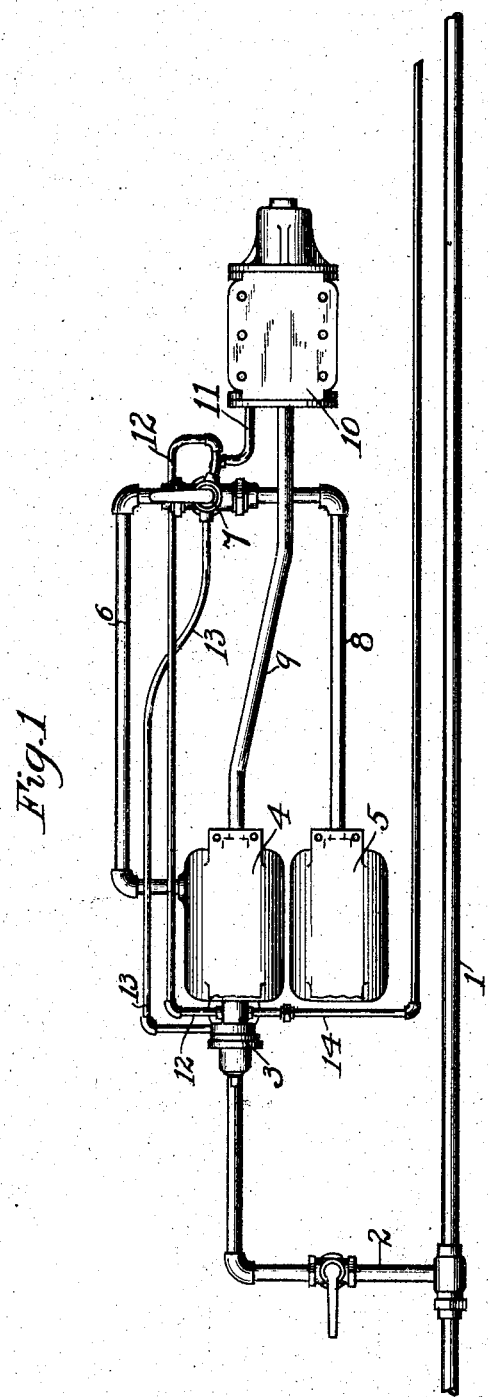
WITNESSES
Jas. B. MacDonald
R. Grantzmiller
INVENTOR
Harry R. Mason
By E. H. Wright Att'y.

No. 790,305.  
PATENTED MAY 23, 1905.  
H. R. MASON.  
FLUID PRESSURE BRAKE.  
APPLICATION FILED AUG. 19, 1903.  
2 SHEETS—SHEET 2.
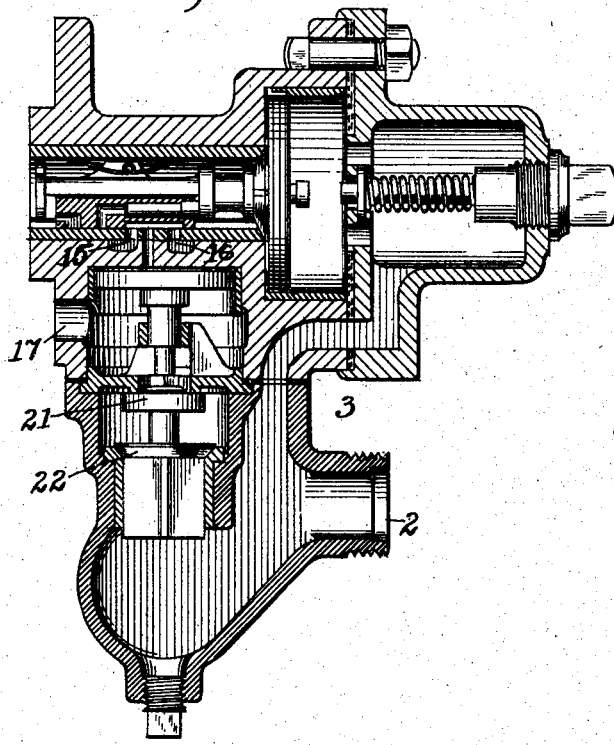
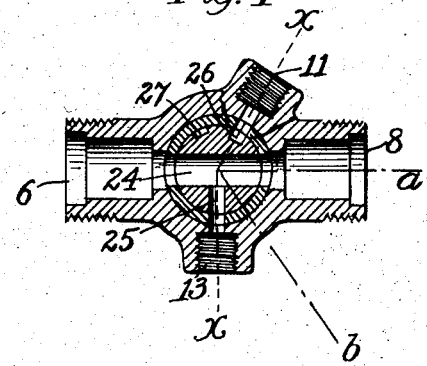
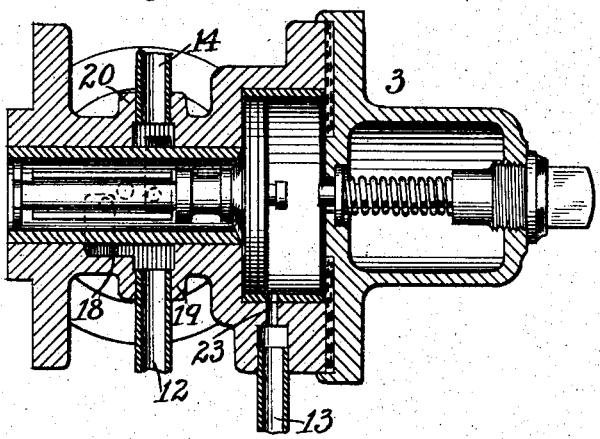
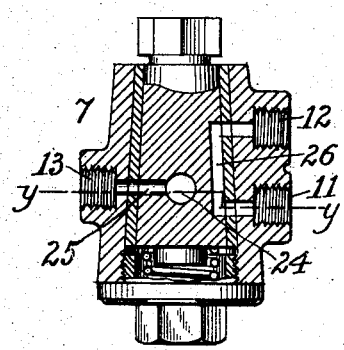
WITNESSES  
Jas. B. MacDonald  
INVENTOR  
Harry R. Mason  
By Wright  
Att'y.

No. 790,305.

Patented May 23, 1905.

UNITED STATES PATENT OFFICE.

HARRY R. MASON, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 790,305, dated May 23, 1905.

Application filed August 19, 1903. Serial No. 170,038.

*To all whom it may concern:*

Be it known that I, HARRY R. MASON, a citizen of the United States, residing at Chicago, county of Cook, State of Illinois, have invented or discovered a certain new and useful Improvement in Fluid-Pressure Brakes, of which improvement the following is a specification.

This invention relates to fluid-pressure brakes; and more particularly to load-brake apparatus in which an additional reservoir is employed with means for connecting the same to the usual auxiliary reservoir for increasing the capacity thereof for heavy braking and for cutting off the additional reservoir from the auxiliary reservoir for light braking of empty cars.

In brake apparatus of this character it is found that when the two reservoirs are connected the rate of flow from the auxiliary reservoir to the brake-cylinder in service applications is different from what it is when only a single reservoir is used and also that the rate of discharge from the brake-cylinder to the atmosphere and time required for releasing are also different, so that the action of the brakes in a mixed train of loaded and empty cars is not uniform.

The object of this invention is to provide means for controlling the rate of flow from the triple valve to the brake-cylinder in service applications and also to regulate the rate of release of brake-cylinder pressure to the atmosphere, according as to whether the brake is being operated with a single reservoir for light braking or with two connected reservoirs for heavy braking.

In the accompanying drawings, Figure 1 is a plan view showing in diagram a car brake apparatus embodying my improvements; Fig. 2, a central vertical section of the triple valve; Fig. 3, a horizontal section of the same; Fig. 4, a horizontal section of the cut-out cock or regulating-valve, taken on the line $y\,y$ of Fig. 5; and Fig. 5, a vertical section of the same, taken on the line $x\,x$ of Fig. 4.

According to the construction as shown the train-pipe 1 is connected, through branch pipe 2, with the triple-valve device 3, which is connected to the auxiliary reservoir 4 in the usual manner. An additional or supplemental reservoir 5 is connected to the first auxiliary reservoir by means of pipes 6 and 8, through which communication is controlled by the regulating-valve or cut-out cock 7. This cut-out cock is also provided with a pipe connection 13, leading to an additional feed-port 23 in the triple-valve device, a pipe connection 12, leading to the service-port of the triple valve, and another pipe connection 11, leading to the brake-cylinder 10. In the cock are located the ports 24 and 25 for establishing communication between pipes 6, 8, and 13 and cavities 26 and 27 for connecting pipes 11 and 12.

The triple-valve device 3 is of the ordinary construction, with the exception that the usual passage leading from the service-port 15 to brake-cylinder port 17 is closed and in place thereof a passage 18 leads around the valve-casing to the boss 19 on one side, where it connects with the pipe 12, leading to the regulating-valve 7. The exhaust-port 16 is of the usual construction leading around to the boss 20 on the opposite side of the valve-casing, where it is connected with the usual retainer-pipe 14.

An additional feed-port 23 is located in the cylinder-bushing and leads to the pipe 13 for increasing the capacity of the means for feeding up the reservoirs from the train-pipe when the two reservoirs are in open communication with each other. This construction is also shown in my prior pending application, Serial No. 123,145, filed September 12, 1902.

It will be noted that the cavity 27 in the cut-out cock 7 is smaller than cavity 26, and this is for the purpose of properly regulating or restricting the rate of flow of air from the triple valve to the brake-cylinder in service applications and the rate of release or exhaust from the brake-cylinder to the atmosphere when the regulating-cock is set so that the reservoirs are cut off from each other and only a single reservoir is being used, as is the case for light braking for empty cars.

The emergency-pipe 9 leads from the brake-cylinder port 17 through auxiliary reservoir 5 to the brake-cylinder for supplying train-pipe air to the brake-cylinder in emergency applications through the check-valve 22 and emergency-valve 21 in the usual manner.

The operation of my improved device is as follows: When it is desired to set the apparatus for heavy braking upon loaded cars, the handle of the regulating-valve 7 is turned to the position indicated by dotted line $a$, Fig. 4, in which position communication is established between the two reservoirs 4 and 5 through pipes 6 and 8 and port 24. The additional feed-port 23 is also open to admit air into the combined reservoir-space through pipe 13 and port 25. In this position also the service-pipe 12 communicates with the pipe 11 and the brake-cylinder through the large cavity 26, which is of the proper size to secure the desired rate of flow of air from the combined reservoir capacity to the brake-cylinder in service applications. On the empty cars the handle of the regulating-cock will be set in position indicated by dotted line $b$, Fig. 4, in which position communication from the additional reservoir 5 to the auxiliary reservoir 4 and from the extra feed-port to the reservoir-space will be closed and the service-pipe 12 will communicate with the pipe 11 and the brake-cylinder through the restricted cavity 27, the size of which is calculated to give substantially the same rate of flow from the single auxiliary reservoir to the brake-cylinder as with the use of the large cavity and combined reservoir capacity and also to secure the release of the air from the brake-cylinder to the atmosphere in substantially the same time as required for the higher brake-cylinder pressure on the loaded cars to exhaust through the larger cavity of the regulating-valve.

Another reason for restricting the flow of air from the triple valve to the brake-cylinder in light braking with a single reservoir is to insure quick action in emergency applications and prevent any tendency of the triple slide-valve to stop at the service position due to a sudden fall of auxiliary reservoir pressure, as might be the case if the larger port or cavity was open from the single reservoir capacity to the brake-cylinder in this position of the valve.

It will now be apparent that by means of my improvements, in which the rate of charging and releasing the brake-cylinder in service applications is regulated according to the capacity of the auxiliary reservoir used for light and heavy braking, respectively, the action of the brakes will be much more uniform, thereby reducing the shocks and jolts incident to the running of the train and securing a much smoother operation.

Having now described my invention, what I claim as new, and desire to secure by Letters Patent, is—

1. In a fluid-pressure brake, the combination with a train-pipe, auxiliary reservoir, triple valve and brake-cylinder, of an additional or supplemental reservoir, means for opening and closing communication between said reservoirs, and means for regulating the rate of charging the brake-cylinder according to the number of reservoirs used.

2. In a fluid-pressure brake, the combination with a train-pipe, auxiliary reservoir, triple valve and brake-cylinder, of means for varying the capacity of the auxiliary reservoir, and means for correspondingly varying the capacity of the service-passage for supplying the brake-cylinder in service applications.

3. In a fluid-pressure brake, the combination with a train-pipe, auxiliary reservoir, triple valve and brake-cylinder, of means for varying the capacity of the reservoir, and means for correspondingly regulating the rate of releasing the brake-cylinder.

4. In a fluid-pressure brake, the combination with a train-pipe, auxiliary reservoir, triple valve and brake-cylinder, of means for varying the capacity of the reservoir, and means for restricting the passage leading from the service-port of the triple valve to the brake-cylinder.

5. In a fluid-pressure brake, the combination with a train-pipe, auxiliary reservoir, triple valve and brake-cylinder, of an additional reservoir, a valve controlling communication between said reservoirs, and means for regulating the rate of charging and releasing the brake-cylinder.

6. In a fluid-pressure brake, the combination with a train-pipe, auxiliary reservoir, triple valve and brake-cylinder, of an additional reservoir, and means for establishing communication between said reservoirs and simultaneously increasing the capacity of the service-passage leading to the brake-cylinder.

7. In a fluid-pressure brake, the combination with a train-pipe, auxiliary reservoir, triple valve and brake-cylinder, of an additional reservoir, a valve for opening and closing communication between said reservoirs, a passage leading from the triple valve to the brake-cylinder, and a cock or valve for controlling said passage.

8. In a fluid-pressure brake, the combination with a train-pipe, auxiliary reservoir, triple valve and brake-cylinder, of an additional reservoir, a valve for opening and closing communication between said reservoirs, a passage from the triple valve through which fluid is released from the brake-cylinder, and a valve controlling the capacity of said passage.

9. In a fluid-pressure brake, the combination with a train-pipe, auxiliary reservoir, triple valve and brake-cylinder, of an additional reservoir, a valve for opening and closing communication between said reservoirs, a passage through which fluid is supplied to and released from the brake-cylinder and a valve controlling said passage.

10. In a fluid-pressure brake, the combination with a train-pipe, auxiliary reservoir, triple valve and brake-cylinder, of an additional reservoir, a service-passage leading to the brake-cylinder, and a valve for simultaneously controlling said passage and communication between said reservoirs.

11. In a fluid-pressure brake, the combination with a train-pipe, auxiliary reservoir, triple valve and brake-cylinder, of an additional reservoir, a passage connecting said reservoirs, an additional feed-passage, a service-passage leading to the brake-cylinder, and a valve for simultaneously controlling all three passages.

In testimony whereof I have hereunto set my hand.

HARRY R. MASON.

Witnesses:
PAUL CARPENTER,
G. A. HAGAR.